(12) United States Patent
Linger et al.

(10) Patent No.: US 7,096,380 B2
(45) Date of Patent: Aug. 22, 2006

(54) SECURITY SYSTEM

(75) Inventors: Mats Linger, Onsala (SE); Göran Svensson, Danderyd (SE)

(73) Assignee: Jokab Safety AB, Kungsbacka (SE)

( * ) Notice: Subject to any disclaimer, the term of this patent is extended or adjusted under 35 U.S.C. 154(b) by 444 days.

(21) Appl. No.: 10/316,793

(22) Filed: Dec. 11, 2002

(65) Prior Publication Data

US 2003/0126510 A1   Jul. 3, 2003

Related U.S. Application Data

(63) Continuation of application No. 10/251,254, filed on Sep. 20, 2002, which is a continuation of application No. PCT/SE01/00588, filed on Mar. 20, 2001.

(30) Foreign Application Priority Data

Mar. 20, 2000   (SE) .................................. 0000971

(51) Int. Cl.
*G06F 11/00*   (2006.01)
(52) U.S. Cl. .......................................... 714/11; 714/12
(58) Field of Classification Search .................. 714/11, 714/12

See application file for complete search history.

(56) References Cited

U.S. PATENT DOCUMENTS 5,367,031 A  *  11/1994  Marchin et al. ......... 525/328.3
5,799,022 A  *  8/1998   Williams ..................... 714/797
5,915,082 A  *  6/1999   Marshall et al. ............... 714/11
6,065,135 A  *  5/2000   Marshall et al. ............... 714/11

FOREIGN PATENT DOCUMENTS

EP      0748762 A2    12/1996

OTHER PUBLICATIONS

Davis, Leroy; CAN BUS, 1998; http://www.interfacebus.com/Design_Connector_Can.html.*
EN954-1 Spec; 2002; www.hvbg.de/e/bia/pub/rep/rep02/pdf_date1/biar0697/3.pdf.*

* cited by examiner

Primary Examiner—Scott Baderman
Assistant Examiner—Timothy M. Bonura
(74) Attorney, Agent, or Firm—Gauthier & Connors LLP

(57) ABSTRACT

The present invention relates to a programmable safety system intended to be used for safety functions, in which a fault in a control circuit does not lead to a safety function being disabled, which system comprises monitoring functions containing at least two control units, input terminals separately coupled to both control units, whereby each control unit executes its own instruction set and continuously compares a result from the execution with each other. At least one control unit can access the in and output terminal status of a second control unit and/or a number of flags, and the control units are arranged to monitor the result of respectively executed instruction sets and control that the results of the executions are substantially equivalent.

26 Claims, 6 Drawing Sheets

SECURITY SYSTEM

PRIORITY INFORMATION

This application is a continuation application of Ser. No. 10/251,254 filed Sep. 20, 2002, which is a continuation application of International Patent Application No. PCT/SE01/00588 filed Mar. 20, 2001, which claims priority to Swedish Patent Application No. 000097 1–2 filed Mar. 20, 2000.

TECHNICAL FIELD OF THE INVENTION

The object of the system is to enable safety functions in machinery, which i.a. comply with the requirement of the Machinery Directive 98/37/EG Appendix 1, 1.2.7- "A fault in the logic of the control circuit as well as damage to the control circuit must not lead to dangerous situations". The system shall also comply with harmonized standard EN 954-1, category 4.

BACKGROUND OF THE INVENTION

The requirement for category 4 is found under section 6.2.5 in the EM 954-1 regulations. The main requirement is:

Safety related components in the control system of category 4 shall be constructed so that:

an individual fault in any of these safety related components does not lead to loss of the safety function, and
the individual fault is detected at or before the next time the safety function is demanded, e.g. immediately, at start, at the end of a work cycle.

If this is not possible, accumulation of faults shall not lead to loss of the safety function. Category 4 implies that a random (stochastic) fault in the system should not lead to a safety function being left out, and the fault should be detected within one on-/off cycle for the safety function.

If the system can determine that a fault corresponds to a particular safety function, e.g. an input or output, the output is disconnected for the actual safety function. Remaining outputs, which are not affected by the fault, continue to function.

European patent application EP 748 762 relates to a safety system for flow control, in which two processors are arranged which control the flow. Each processor runs its own programmed, in the form of different "firmweare", and controls its own relay. If one of the relays is not controlled in the correct way, the processor linked to that relay ceases its control.

BRIEF DESCRIPTION OF THE INVENTION

For obtaining the objectives stated above, the invention provides a programmable safety system intended to be used for safety functions in which a fault in one control circuit does not lead to non-occurrence of a safety function, which system comprises monitoring functions containing at least two control units, input terminals separately coupled to both the control units, whereby each control unit executes its own instruction set, and continuously compares a result from the execution with each other. At least one control unit can access the input and output terminal status of a second control unit and/or a number of flags and the control units are arranged to monitor the result of each executed instruction set and to control that the results of the executions are substantially the same.

Thus, the system according to the invention complies with the requirements of category 4 according to harmonized standard EN 954-1 or the requirement of the Machinery Directive 98/37/EG appendix 1, 1.2.7.

Preferably, the input terminals are continuously read with a certain frequency, and a filter time is assumed such that a decision is made based on the majority of the three latest readings, i.e. two readings after a change. Some of the input terminals have pull up or pull down resistors which are software-controlled so as to selectively be able to receive NPN- or PNP sensors.

Moreover, the system comprises a charging generator where the output voltage is generated by a capacitor which is continuously charged and discharged by transistors. The transistors are each controlled by a respective control unit and conduct alternately so that the capacitor is firstly charged by means of the first transistor opening to plus; thereafter a discharge occurs by means of the first transistor closing and the second transistor opens to zero volts. The charging generator demands that the control units are active, which implies immediate interruption of the power supply to the output terminal if a control unit ceases to execute instructions in a correct way. To obtain a more even output voltage, two charging generators are coupled in parallel with each other.

In a most preferred embodiment each control unit controls its own relay via separate transistors and both the transistors are made of different technology. Moreover, the relays have forced contacts, monitored by the control units. Hence, a switching contact is coupled back to the control unit in each forced relay for controlling that it has fallen, and, if the control unit only receives an answer from one of the two relays duplicating each other, the unit tries to activate and fell the malfunctioning relay again.

Preferably, the fall time is monitored at the output terminal, which can also be used for detecting an external short circuit to another foreign voltage. When the control detects a short circuit to a foreign voltage, the output terminal is prevented from resuming, and a fault is indicated. The output terminals are dynamic, which operate input terminals to generate a unique pulse train, which implies that short circuits between channels coupled to different dynamic output terminals can be detected.

Every control unit in a network is identified by means of an identity carrier and the identifier is an externally mounted circuit which stores a unique number and constitutes a part of the electric installation/the location where the unit is physically mounted. Thus, a unit is arranged to read the number of the identifier and thereby determine its own identity. Thus, the correct identity is maintained in case of change of a unit.

Preferably, the units are coupled together via a data bus and have access to the input-, output status and/or a number of flags of one another's. When a unit losses contact with the bus communication, other units consider its I/O as logic zeroes. The bus is preferably a CAN bus.

Moreover, the system is connected to light barriers, of which the transmitters are operated by one dynamic output terminal each, that the receivers are coupled to one input terminal each, that the input terminals are provided with output transistors via which cables returning from the receiver to the input terminal have voltage applied thereto, whereby the system performs a test sequence with assistance therefrom which can distinguish a short circuit between the output terminal cables of the receivers from lighting.

The invention also relates to a method in a programmable safety system intended to be used for safety functions, in which a fault in a control circuit does not lead to failure of a safety function which system comprises monitored functions consisting of at least two control units, input terminals separately coupled to both the control units, whereby each control unit executes its own instruction set and continuously compares a result from the execution with one another. The method comprises making accessible at least one input- and/or output terminal status of a control unit and/or a number of flags to another control unit and arranging the control units for monitoring the result of one instruction set each and to control that the results of the executions are substantially equivalent. Said result of the executions is provided in the form of status for input- and/or output terminals and/or a number of flags.

BRIEF DESCRIPTION OF THE DRAWINGS

In the following, the invention will be further described in a non-limiting way with reference to the accompanying drawings in which.

DETAILED DESCRIPTION OF THE INVENTION

Figure 1:
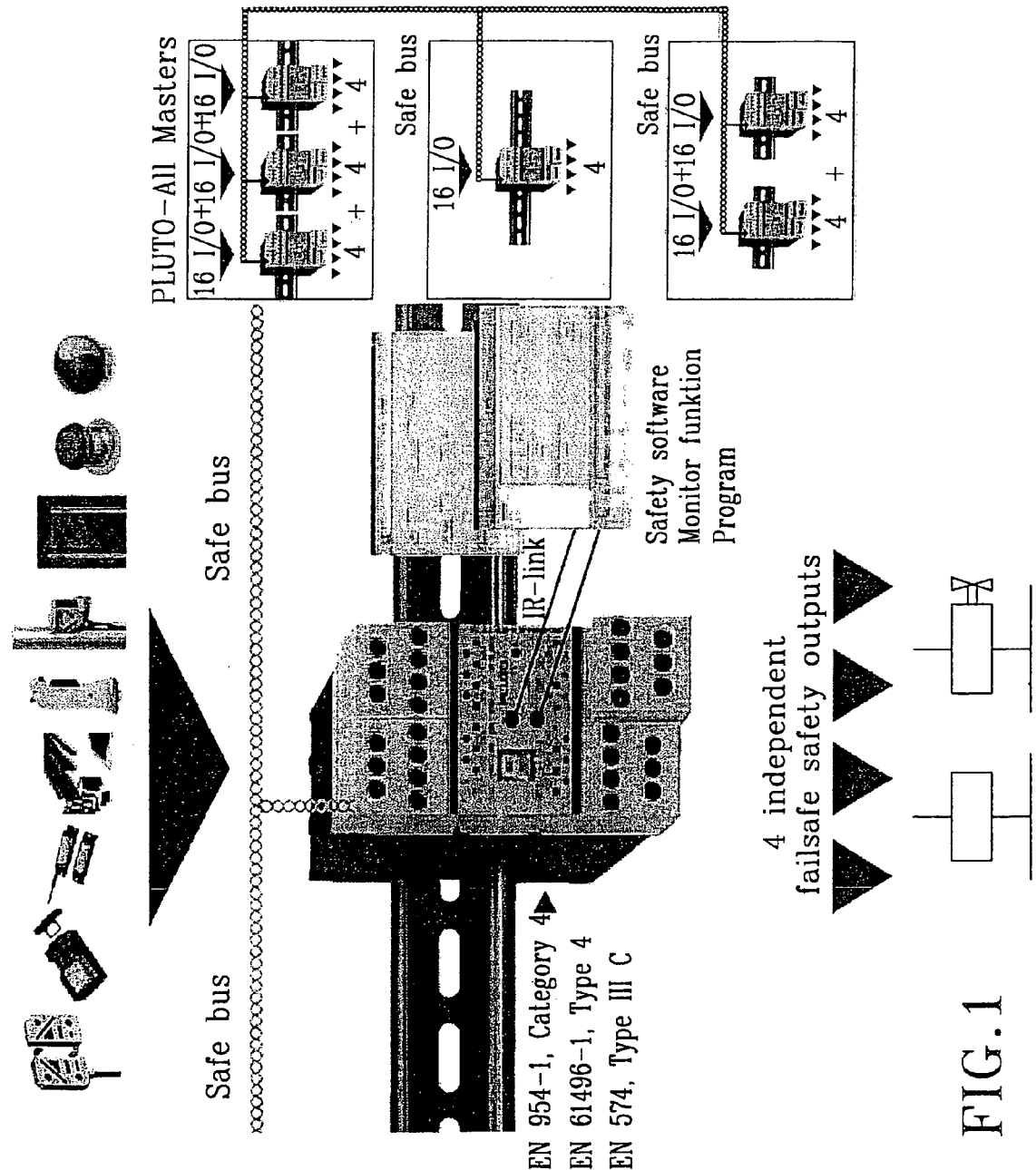
FIG. 1 schematically shows an embodiment of a system according to the invention, FIG. 2 schematically shows a so-called "charging pump" in the system according to the invention, FIG. 3 schematically shows a part of the system according to the invention, FIG. 4 schematically shows different types of output terminals in the system according to the invention, FIG. 5 schematically shows input terminals in the system according to the invention, FIG. 6 schematically shows different connection strips, in the system according to the invention, FIG. 7 schematically shows a part of the system according to the invention, and FIGS. 8 and 9 schematically show different types of output terminals.

FIG. 1 schematically shows the system according to the invention. The various components in the system according to the invention are described in the following.

Input Terminals

All input terminals are redundant. A single input terminal provides stop according to category 4, EN 954-1.

The input terminals are continuously read by a certain frequency. The filter time is constituted by a decision being made based on the majority of the three latest readings, i.e. two readings after a change. There is a possibility to decrease or increase the filter time.

Some of the inputs have software-controlled pull-up or pull-down resistors in order to be able to selectively receive NPN- or PNP-sensors.

Charging Pump

Figure 2:
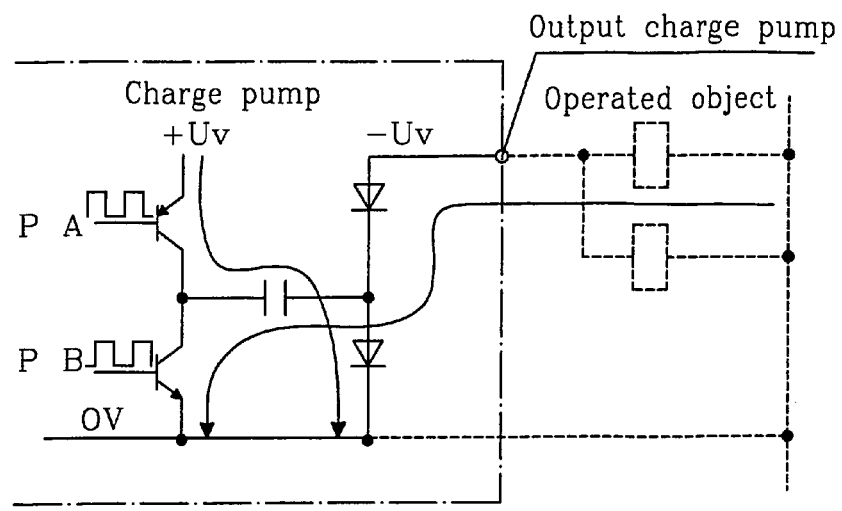

"The charging pump", schematically shown in FIG. 2, is a construction in which the output voltage is generated by a capacitor which is continuously charged and discharged by two transistors. The two transistors, which are controlled by one processor each, alternately conduct so that the capacitor is firstly charged by means of the first transistor opening to plus. Thereafter, discharge occurs by means of the first transistor closing and the second transistor opening to zero volts. During the discharge phase, the capacitor "sucks" current from the output terminal, and thereby the negative voltage on the output terminal occurs.

Due to the fact that the charging pump demands that the processors are active, the charging pump operates as a so-called "watchdog", which effectively immediately interrupts the energy supply to the output terminal if a processor stops executing the programme in the correct way.

For obtaining a more regular output voltage, two charging pumps can be coupled in parallel with each other. These two charging pumps work alternately, which implies that when the capacitor in one of the charging pumps is charged, the capacitor in the second charging pump is discharged. This construction is defined as a double charging pump.

Relay Output Terminals

Each processor controls one relay each via separate transistors. For obtaining diversity, the both transistors are made of different technology. The relays have forced contacts and are monitored by the processors.

The software supervises the fall time of the relays.

For additional safety, the voltage is generated to the relay windings of a charging pump. In this manner, the processors have a further possibility to fell the relays, in addition to both the transistors controlling the relays directly.

A switching contact in each forced relay is coupled back to the processor for monitoring whether it has fallen. If the processor only receives a response from one of the two relays which duplicate each other, the processor tries to conduct and fell the malfunctioning relay again. Temporary faults in the controlling circuit on account of oxide on the contacts or the like do not necessarily imply generation of an alarm and stoppage.

Charging Pump Outlet Terminals

Each output terminal is operated by a double charging pump. Since the construction has diodes working as free-wheel diodes and provide an extended fall time in case of inductive loads to the output terminal, the output terminal is complemented with an additional transistor in series with the output terminal. The transistor is monitored by an input terminal to one of the microprocessors. The transistor is controlled by the other processor.

The input terminal to the processor controlling the fall time can also be used for detecting an external short circuit to another foreign voltage.

Fall Time Supervision for Charging Pump Output Terminals

In the application program, the fall time supervision for any of the charging pump output terminals can be chosen. When the fall time supervision for an output terminal is released, the output terminal is prevented from returning and the fault is indicated.

Actuating the resetting button can reset the fault.

Short Circuit to a Foreign Voltage, Charging Pump Output Terminal

When the supervision detects short-circuit to a foreign voltage, the output terminal is prevented from returning and the fault is indicated.

Actuating a resetting button can reset the fault.

Transistor Output Terminals No Safety

The output terminals are intended for indication and as dynamic output terminals. Dynamic output terminals are output terminals operating input terminals. The three first output terminals IQ10–IQ12 can be used as dynamic output terminals. The dynamic output terminals yield a unique pulse train making it possible to detect short circuits between channels coupled to different dynamic output terminals.

Two of the output terminals are monitored for current for complying with the requirement of supervision of indicator lamps for bypassing according to EN 61 496-1.

Identifiers

For identifying each unit in a network there is an identity carrier which is connected to a particular connecting strip. The identifier is an externally mounted circuit storing a unique number and constitutes a part of the electric installation/the location where the unit is physically mounted. A unit can read the number of the identifier and thereby determine its own identity. In case of change of a unit, the correct identity is maintained. The identity of every unit is important in a network coupling for being able to number the I/O in the system. When for instance an input terminal is used as a condition in the application programme, the denomination denotes both in which unit there is an input terminal as well as the input terminal number of the input terminal within the unit.

The system also prevents mixing-up units with different programmes by means of the user programme being able to be locked to only work together with the correct identifier.

CAN Bus External Communication

The units coupled to the bus obtain access to each other's input terminal status and output terminal status a number of flags. When a unit losses contact with the bus communication, the other units consider the I/O as logical zeroes.

Excess Light On Light Barriers

The system can also cope with light barriers, where there are traditionally problems with interference from transmitters of other light barriers. The transmitters of the light barriers are operated by one dynamic output terminal each. The receivers are coupled to one output terminal each. Due to the fact that the input terminals are provided with output terminal transistors, it is possible to apply return voltage to the cable from the receiver to the input. The system can, with assistance from this, perform a test sequence, which can distinguish short-circuiting between the output cables of the receivers from excess lighting. Excess lighting is defined as a transmitter of a light barrier system illuminating two receivers simultaneously.

Transmission of programmes between the target system (safety system) and the programme developing system occurs wirelessly via an opto link.

The Handling of Input Terminals and Output Terminals

The solution is based on a so called two processor solution, where both the processors should arrive at the same result when executing the application progamme as well as having "the same opinion" regarding its input- and output terminal status. All the processors communicate with each other via the Can bus, also the sister processors between themselves. Hereinafter, the processor and the sister processor are called the processor A and the processor B, respectively.

Data for input and output terminals is stored in a RAM memory. The part of the RAM memory in a processor handling the I/O is divided into two parts; one part for the input terminal status and one part for the output terminal status.

The Handling of Input Terminals/Input Terminal Status

The input terminals are called I0.0 . . . and so on upwards. The first unit in a network handles the input terminals I0.0–I0.17, the second unit I1.10–I1.17, the third unit I2.0–I2.17 and so on.

The RAM is divided into three parts for the input terminals:

IA000 . . . -data acquired by the A-processors,
IB000 . . . -data acquired by the B-processors and
one for process data I000 . . .

Process data is data used by the application programme. The division of the RAM is performed so that the address for the first input terminal in the three parts, respectively, is not an even multiple of 2. Thus, more than one bit alteration in the address word is required for pointing out IA000 instead of IB000.

The working procedure for e.g. the processor A in the first unit is the following:

The processor reads the input terminals in the unit I0.0–I0.17 of its own, and places the results in the memory addresses IA000–IA017, as well as sending it on the bus to remaining processors. The processor continuously reads the input status of other processors from the bus, and places the data on the remaining part of IA . . . and IB . . . . Among the data comes data from the sister processor B, which is placed in IB000–IB017. Thereafter the memory areas IA . . . and IB . . . are compared, and if the content is similar, the content is copied to the memory area for the process data I000 . . . Discovered dissimilarities in the comparison lead to an alarm as well as the processor felling its own safety output terminals. However, short duration dissimilarities are accepted, since it will occur on account of hard ware-like dissimilarities in the hardware of the both channels.

The Handling of Output Terminals/Output Terminal Status

The output terminal status is handled in the same way as the input terminal status, the difference being that it is not the hardware which gives the change of status, but is instead the application programme which has made the decision that a certain output terminal is going high or low. The application programme is the part of the software written by the user.

In a corresponding way as for the input terminal status, there are memory areas QA000 . . . , QB000 . . . , and Q000 for process data . . . The difference in computer processing is that each unit's process data is updated by the application programme of each processor, respectively. Thereafter the process data is copied to its location in QA . . . /QB . . . for comparison as well as being sent out on the bus.

The invention is a programmable safety system intended to be used for safety functions, where it is not accepted that a fault in the control circuit leads to the safety function not being activated. To achieve this, the functions are therefore doubled and monitored. In comparison to a conventional PLC-system, consequently, the invention has two microprocessors. Every input terminal is separately coupled to both the processors, both having a memory of its own, executes one programme each and continuously compares the result with each another. Every safety output terminal is coupled to both the processors, and can therefore not work until these are in agreement that the conditions are fulfilled.

The invention is primarily constructed to comply with the requirement of the machinery directive for safety in control systems, and the requirements for category 4 according to harmonized standard EN 954-1. However, this does not prevent use within other areas such as processing industry, boiler plants etc, where the corresponding safety requirements are demanded.

The invention is accommodated in a wide enclosure, which has been fixedly snapped on a DIN-bar in a control panel or another enclosure. External conductors are connected on a screw connection block. For facilitating the work and preventing incorrect coupling in case of exchange of a unit, the connecting strips are detachable.

Electrical Connection

Figure 3:
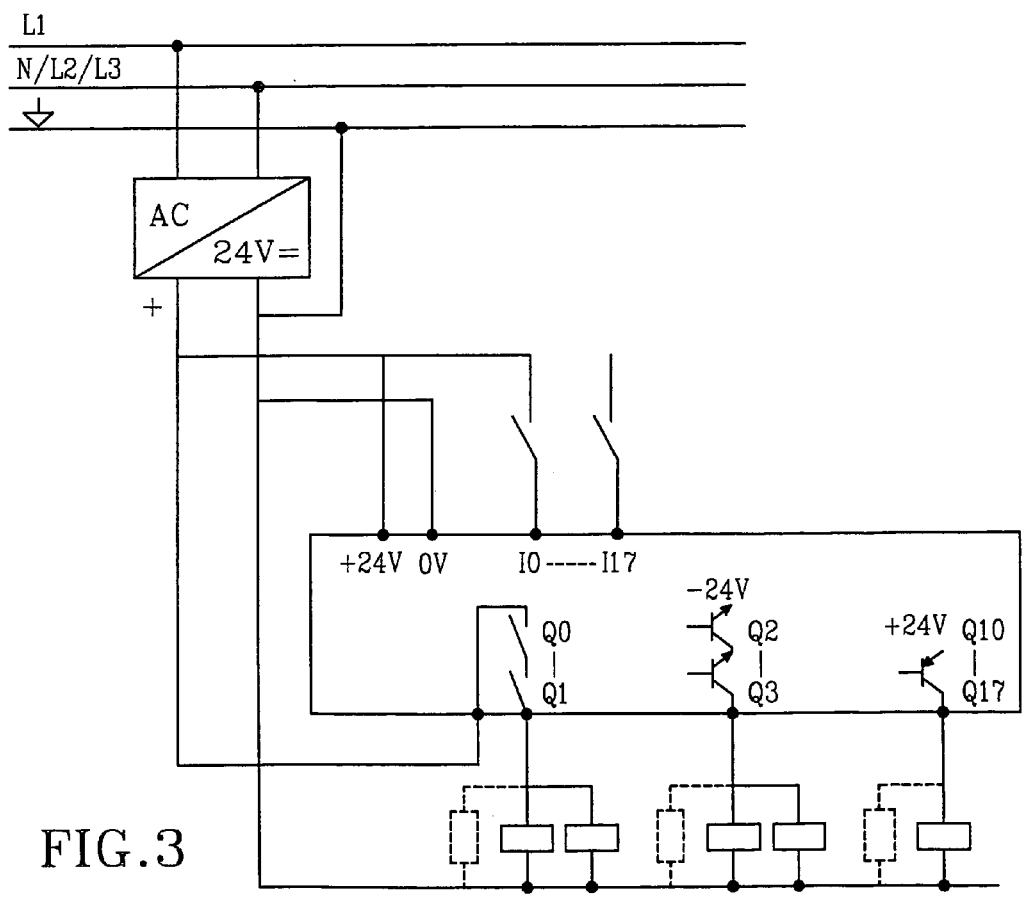

The system, schematically shown in FIG. 3, can be fed with 24 VDC. The connection of the system for 0 V should be connected to protective ground, on one hand for electrical safety reasons, and on the other hand for detecting each faults which may otherwise disable the safety function (see EN 60 204-1, 9.1.4.).

Inputs and Outputs

Figure 4:
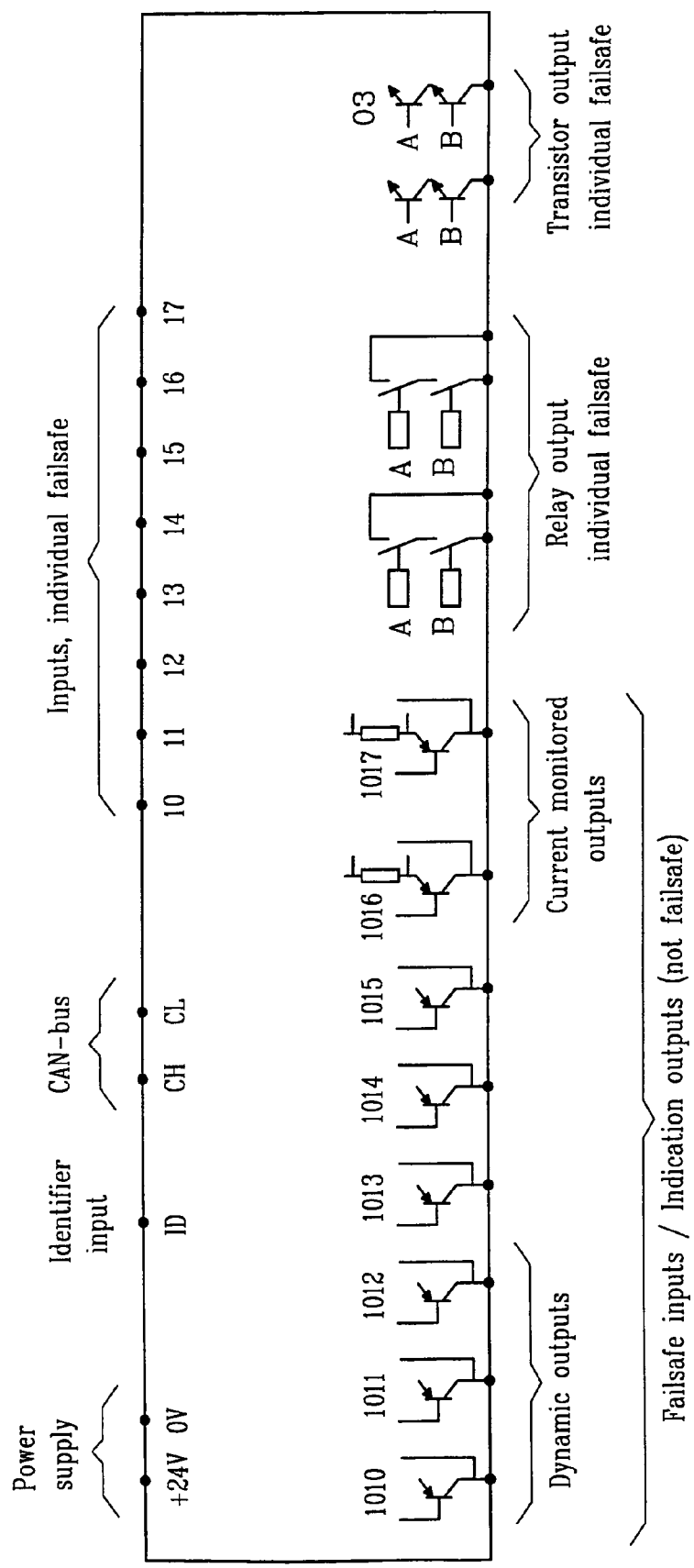

To be as comprehensive as possible, the invention is provided with a varying offer of types of input- and output terminals, schematically shown in FIG. 4.

Figure 5:
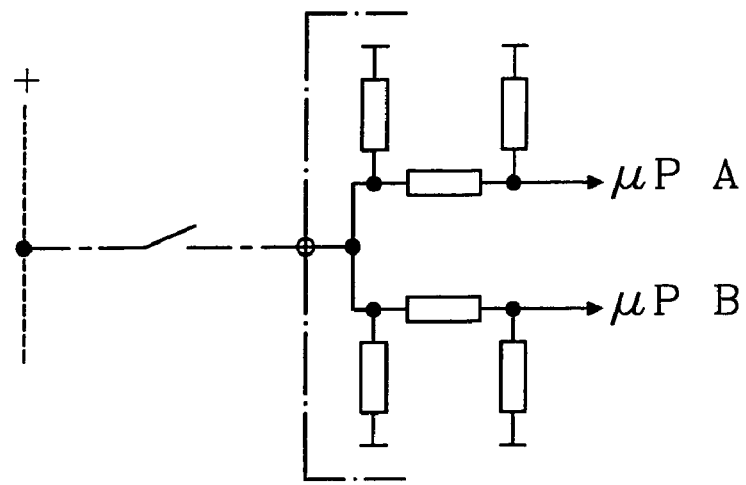

I0–I7 Digital safety input terminals
  Each input terminal, schematically shown in FIG. 5, is connected to both processors, which permits coupling of safety functions of one channel as well as of two channels. The input terminals can be operated by e.g. +24 V or any of the dynamic output terminals IQ10–12.

Figure 7:
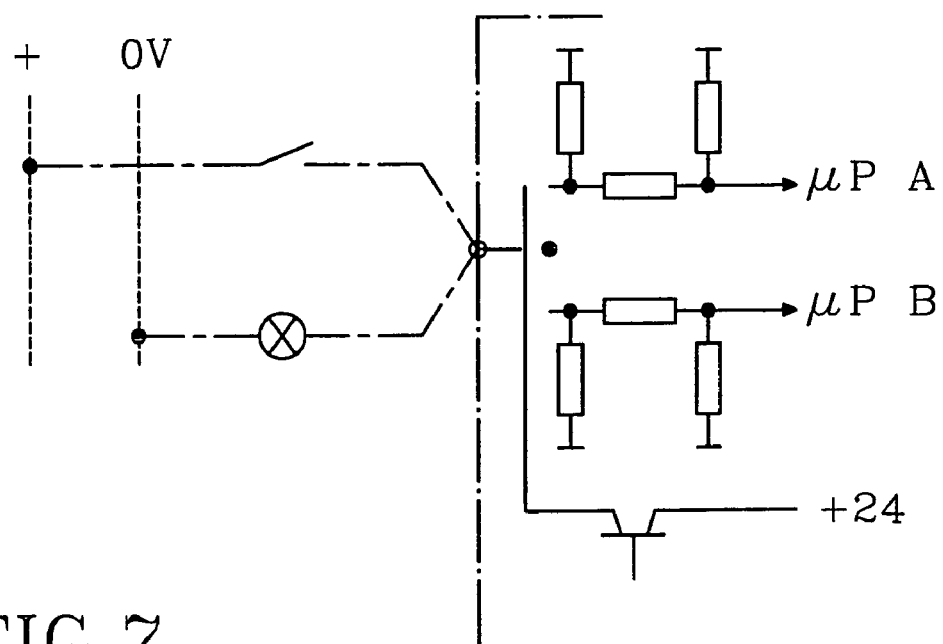
Figure 6:
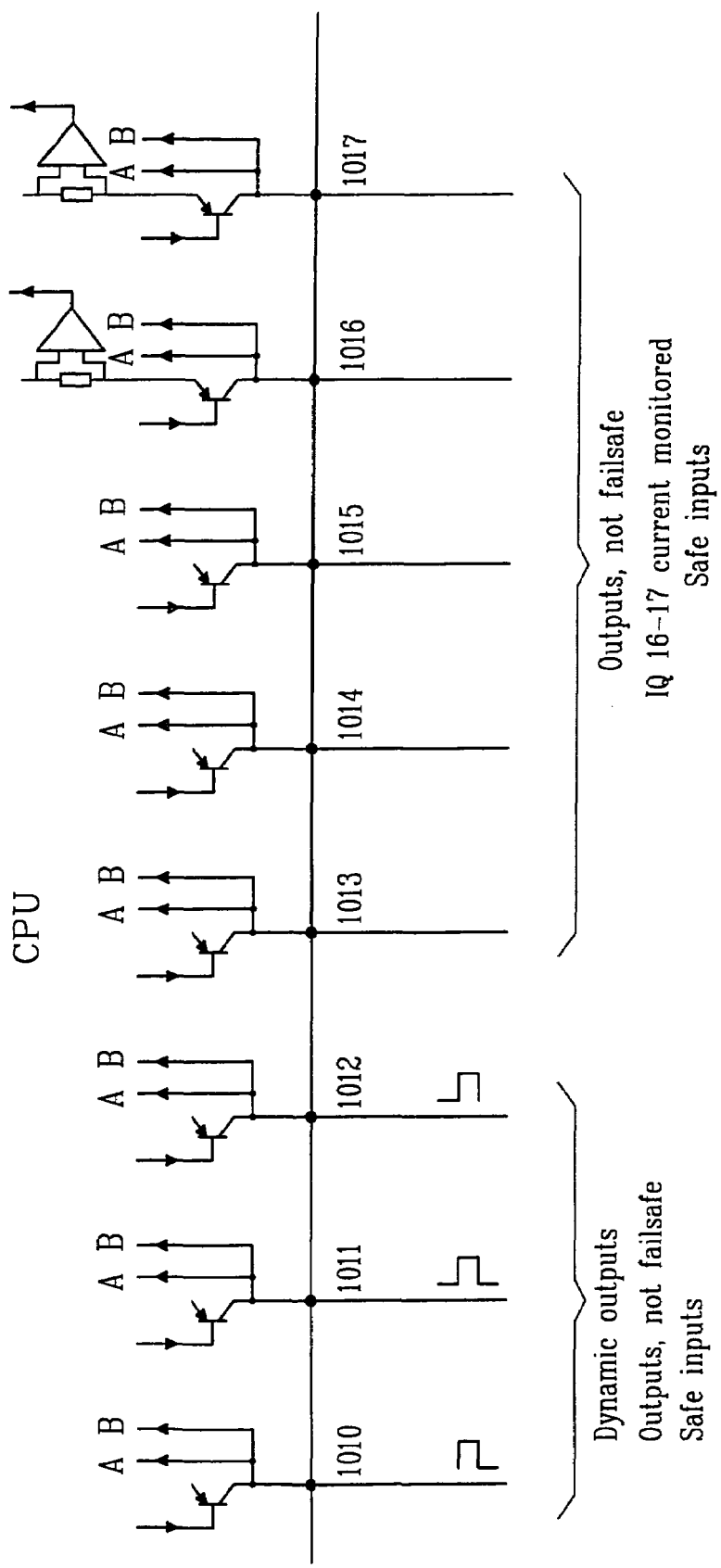

IQ10–17 Digital safety input terminals, digital output terminals (not safety)
  This category of 8 connecting strips, schematically shown in FIG. 6, contains 4 functions.
  Each connecting strip is connected to both processors as an input terminal and can thereby be used as a safety input terminal.
  Each connecting strip also has an output transistor, which implies that the user can choose to configure the strips as output terminals, though not as safety output terminals. The output terminals are intended for functions, which do not require redundancy, e.g. indicator lights, schematically shown in FIG. 7.
  IQ10–IQ12 can be configured as dynamic output terminals used for operating input terminals. Once an input terminal is configured as such, a unique pulse train is generated. Due to the fact that the input terminal is configured to only accept this pulse train as an input condition, the system can detect external short circuits. See further description.
  IQ16–IQ17 can monitor the output current when the connecting strips are used as output terminals. The function is primarily intended for supervision of bypass lamps (muting lamp) according to EN 61 496-1. In certain cases, it is appropriate to indicate that a safety arrangement is bypassed. By controlling that a current flows it is possible to supervise that the filament of the lamp is unbroken.

Q0–Q1 Safety output terminals relay
  Potential free relay output terminals, where every output terminal is separately redundant by doubling two relay contacts in series, controlled by each processor. Irrespective of the risk for external short circuits in e.g. cabling, one single output terminal can be used for controlling a safety function. In addition to the relays being controlled by separate transistors, the voltage is generated to the relay windings by a charging pump. (For the function of the charging pump, see following description for transistor output terminals.)

Figure 8:
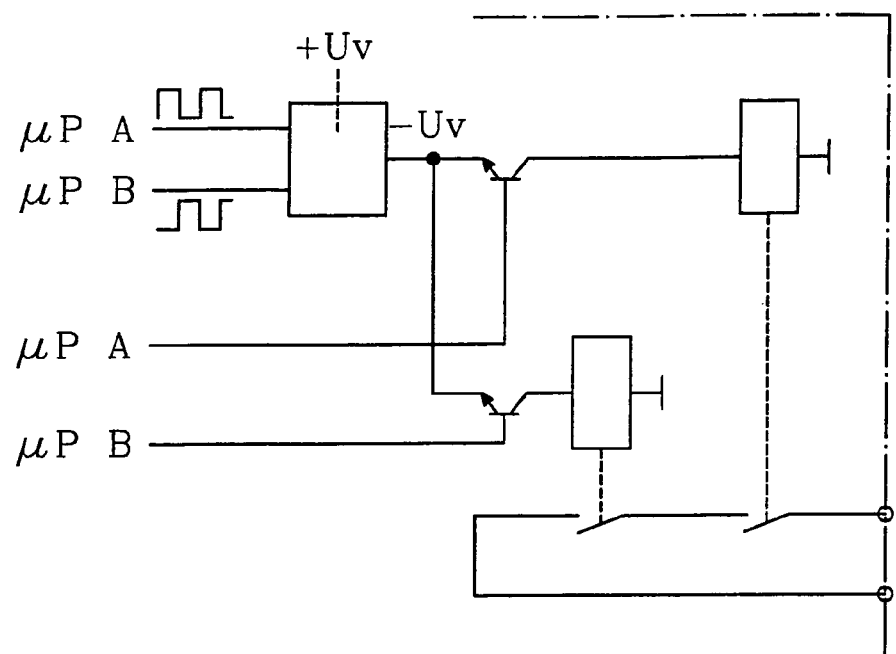
Figure 9:
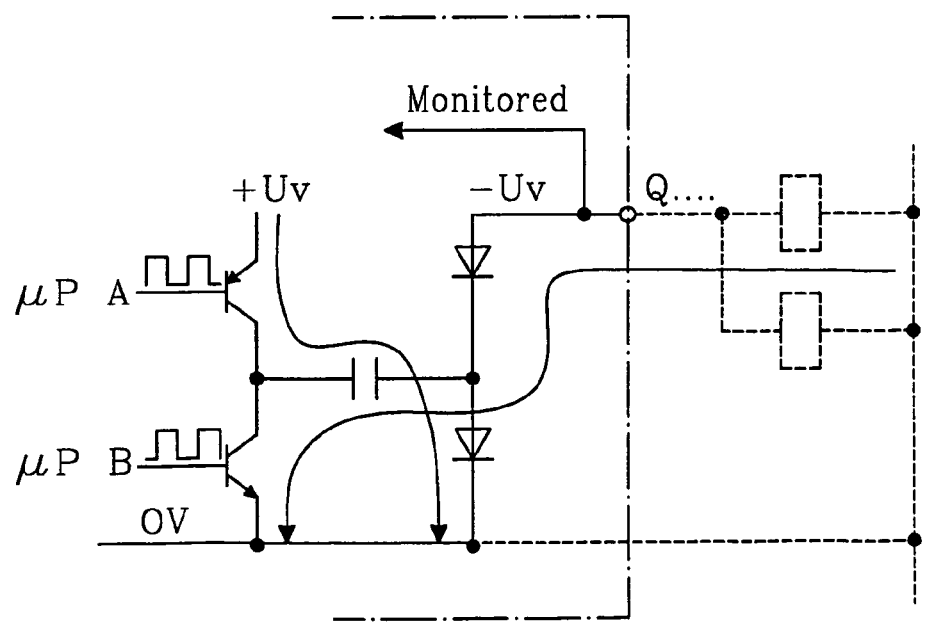

Q2–Q3 Safety output terminals transistor
  Digital safety output terminals, where every output terminal is separately redundant, and thereby can alone control a safety function, see FIG. 8 and 9. The output voltage is nominally approx. −24 V.
  The negative output voltage is due to the fact that the principle of the charging pump is applied. The charging pump is a construction where the output voltage is generated by a capacitor which is continuously charged and discharged by two transistors. The two transistors alternately conduct so that the capacitor is firstly charged by means of one of the transistors opening to plus, which thereafter closes, and the second transistor opens to zero volt and is discharged. During the discharge phase, the capacitor "sucks" current from the output terminal, and the negative voltage on the output thereby occurs. Due to the fact that the construction requires all the components to work and continuously alternate the state in the correct phase, a fault in any of the involved components causes the generation of the output voltage to immediately stop.
  An advantage of having negative voltage on the output terminal for a user, is that this is not normally the voltage used in existing electric systems. Therefore the invention can discover external short circuits between the output terminal and foreign voltages, since the voltage level of the output terminal is monitored.

Bus Communication

Several units, according to the invention, can be coupled together with a CAN bus in a network. The coupling is made by means of connecting the connecting strips CH and CL of each unit, respectively, via intertwined dual cabling. As soon as the coupling is performed, the units are able to read each other's I/O.

In case of network coupling, the principle is that each unit executes its own programme and thereby lives an independent life. Interruption on the bus leads to the I/O in a unit to which contact is lost, being considered as put to 0 by the other units, though the programme execution proceeds. Thus, it is the programme of the user which determines the consequence of an interruption. For instance, if an input terminal put to 1 in another unit constitutes conditions for drawing an output terminal, the output terminal will fall, while another output terminal which only has its own I/O as conditions, will not be affected by the interruption.

The development of user programmes is performed by a PC computer. The communication between the PC and the PLC system occurs wirelessly via IR port. In addition to down- and up loadings of programmes there is a monitor function, whereby the PC computer can read the actual status for the input terminals, output terminals and the auxiliary memories.

The number of units, components, signals, signal levels, etc according to the preceding description are given as examples, and can be varied with consideration to application, requirements, etc.

The invention claimed is:

1. A programmable safety system having safety functions, in which a fault in a control circuit does not lead to a safety function being disabled, said system comprising:
  a first and a second control unit, for monitoring functions, inputs separately coupled to both of said first and second control units,
  each of said first and second control units being arranged to execute its own instruction set and continuously compares a result from said own execution with the other ones execution,
  said first control unit being arranged to access status of an input and output terminal of said second control unit and/or a number of flags said first and second control units being arranged to monitor a result of respectively executed instruction sets and to control that the results of the executions are substantially equivalent, and each control unit comprising means for controlling a respective relay via separate transistors.

2. The system as claimed in claim 1, complying with requirements of category 4 according to the harmonized standard EN 954-1.

3. The system as claimed in claim 1, complying with requirements of the machinery directive 98/37/EG Appendix 1, 1.2.7.

4. The system as claimed in claim 1, wherein the input terminals are continuously read at a certain frequency.

5. The system as claimed in claim 4, comprising a filter time based on a decision made based on a majority of three latest readings.

6. The system as claimed in claim 4, wherein a number of the input terminals comprise pull-up or pull-down resistors, which are software controlled, for selectively receiving NPN- or PNP sensors.

7. The system as claimed in claim 1, further comprising a charging generator, in which an output voltage is generated by a capacitor which is continuously charged and discharged by transistors.

8. The system as claimed in claim 7, wherein the transistors each of which are controlled by a respective control unit alternately conduct so that capacitor is firstly charged by means of the first transistor opening to plus, thereafter discharge by means of the first transistors closing and the second transistor opening to zero volt.

9. The system as claimed in claim 8, wherein the charging generator requires that the control units are active, which leads to an immediate interruption of the energy supply to the output terminal if a control unit ceases to executing instructions in a correct way.

10. The system as claimed in claim 7, wherein an even even output voltage is obtained by means of two charging generators being coupled in parallel with each other.

11. The system as claimed in claim 10, wherein both transistors are made of different technology.

12. The system as claimed in claim 10, wherein relays have forced contacts, monitored by the control units.

13. The system as claimed in claim 11, wherein a switching contact in every forced relay is coupled back to a first or second control unit for controlling that it has fallen, and if the control unit only receives an answer from one of two relays doubling each other, the unit tries to conduct and fell the missing relay again.

14. The system as claimed in claim 1, wherein a fall time is monitored at the output terminal, which fall time is used for detecting external short circuit to another external voltage.

15. The system as claimed in claim 14, wherein when a monitoring detects short circuit to an external voltage, the output terminal is prevented from returning and a fault is indicated.

16. The system as claimed in claim 1, wherein said output terminals are dynamic, operateing input terminals and generating a unique pulse train, whereby short circuits between channels coupled to different output terminals are detected.

17. The system as claimed in claim 1, wherein each unit in a network is identified by means of an identity carrier.

18. The system as claimed in claim 17, wherein said identifier is an externally mounted circuit which stores a unique number and constitutes a part of the electric installation location where the unit is physically mounted.

19. The system as claimed in claim 18, wherein a unit is arranged to read the number of the identifier, and thereby determine its own identity.

20. The system as claimed in claim 17, wherein a correct identity is maintained in case of change of a unit.

21. The system as claimed in claim 1, wherein said units are coupled together via a data buss and have access to each other's input and output terminal status and br a number of flags.

22. The system as claimed in claim 21, wherein said when a unit loses contact with the bus communication, the other units consider its I/O as logical zeroes.

23. The system as claimed in claim 21, wherein said bus is a CAN bus.

24. The system as claimed in claim 1, being connected to light barriers, the transmitters of which are operated by one dynamic output terminal each, that the receivers are coupled to one output terminal each, that the input terminals are provided with output transistors via which return voltage is applied to cables from the receiver to the input terminal, whereby the system thereby performs a test sequence which can distinguish short circuits between the output cables of the receivers from excess lighting.

25. A method in a programmable safety system intended to be used for safety functions, in which a fault in a control circuit toprohibits disablement of a safety function, said system comprising monitored functions containing at least two control units, input terminals separately coupled to both control units, whereby each control unit executes its own instruction set and continuously compares a result from the execution with each other, the method comprising the steps of:

making available at least in and output terminal status of a second control unit and/or a number of flags for a control unit, supervising by said control units a result of each respectively executed instruction set, controlling that the results of said executions are substantially equivalent, and controlling by each control unit a respective relay via separate transistors.

26. The method as claimed in claim 25, wherein the result of the executions is provided in the form of status for the input terminals and/or output terminals and/or a number of flags.

* * * * *